United States Patent
Irsay

[15] 3,678,170
[45] July 18, 1972

[54] PHARMACEUTICAL METHOD AND COMPOSITIONS EMPLOYING SUBSTITUTED CHROMANONE OXIMES AND CHROMANONE OXIME ETHERS

[72] Inventor: Robert D. Irsay, Cambridge, Mass.

[73] Assignee: E. I. du Pont de Nemours and Company, Wilmington, Del.

[22] Filed: March 26, 1970

[21] Appl. No.: 23,016

Related U.S. Application Data

[60] Division of Ser. No. 786,443, Dec. 23, 1968, Pat. No. 3,510,497, which is a continuation-in-part of Ser. No. 734,549, June 5, 1968, abandoned, which is a continuation-in-part of Ser. No. 580,606, Sept. 20, 1966, abandoned.

[52] U.S. Cl. ................................................424/283
[51] Int. Cl. ...............................................A61k 27/00
[58] Field of Search ......................................424/283

[56] References Cited

OTHER PUBLICATIONS

Powell, Jacs, Vol. 45, pp. 2,708– 2,711 1923.

*Primary Examiner*—Albert T. Meyers
*Assistant Examiner*—Daren M. Stephens
*Attorney*—Gerald A. Hapka

[57] ABSTRACT

This disclosure teaches the preparation of chromanone oximes, such as, 7,8-dichloro-4-chormanone oxime and their use as diuretics in warm-blooded mammals.

18 Claims, No Drawings

PHARMACEUTICAL METHOD AND COMPOSITIONS EMPLOYING SUBSTITUTED CHROMANONE OXIMES AND CHROMANONE OXIME ETHERS

CROSS-REFERENCE TO RELATED APPLICATIONS

This application is a division of my copending application, Ser. No. 786,443, filed Dec. 23, 1968, and now U.S. Pat. No. 3,510,497, which in turn is a continuation-in-part of my copending application, Ser. No. 734,549, filed June 5, 1968, and now abandoned, which in turn is a continuation-in-part of my application, Ser. No. 580,606, filed Sept. 20, 1966, now abandoned.

DESCRIPTION OF THE INVENTION

This invention relates to pharmaceutical compositions containing as the active ingredient substituted chromanone oximes, and substituted chromanone oxime methyl ethers, and to the method of using these compounds to induce diuresis in mammals.

More particularly, this invention is directed to the use of 7-substituted-4-chromanone oximes, 6,7-disubstituted-4-chromanone oximes, 7,8-disubstituted-4-chromanone oximes, 7-substituted-4-chromanone oxime methyl ethers, 6,7-disubstituted-4-chromanone oxime methyl ethers and 7,8-disubstituted-4-chromanone oxime methyl ethers.

According to this invention, I have discovered a novel class of compounds which are useful in pharmaceutical applications. Particularly, they are diuretic agents as shown by their ability to increase urine volume and electrolyte output in rats and dogs. These novel compounds also exhibit pharmacological activity as anti-hypertensive agents.

The compounds of this invention have the formula (1)

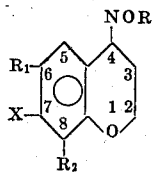

where

R is hydrogen or methyl;

$R_1$ and $R_2$ can be the same or different and are each selected from the group consisting of hydrogen, bromine, fluorine or chlorine, with the limitation that at least one of $R_1$ and $R_2$ must be hydrogen;

and X is bromine or chlorine.

Within the overall scope of the compounds of this invention, those compounds of Formula (1) are preferred in which R is methyl because the improved chemical stability of these ethers allows formulations of this invention that have a longer shelf life and improved storage characteristics.

Most preferred of the compounds of this invention due to their outstanding pharmaceutical utility are 7-chloro-6-fluoro-4-chromanone oxime methyl ether and 7-chloro-8-fluoro-4-chromanone oxime methyl ether.

The substituted chromanone oximes or substituted chromanone oxime ethers of this invention are prepared by reacting the appropriately substituted chromanone with hydroxylamine or methoxyamine in a suitable solvent such as water, aqueous acetic acid, aqueous lower alkanols, dioxane, dimethylformamide, etc. at temperatures ranging from 20° C. to 100° C.

The appropriately substituted chromanones are prepared by ring closure of the correspondingly substituted 3-phenoxypropionic acids usually employing a strong acid such as sulfuric or hydrofluoric or polyphosphoric acid at a temperature of 0°C. to about 180°C. The starting material 3-phenoxypropionic acids can be readily prepared by the condensation of the appropriate substituted alkali phenolates with β-propiolactone in a solvent medium, preferably dimethylformamide, or water or other suitable reactions known for making compounds of this general class.

Illustrative of the compounds of this invention are the following:

7-chloro-4-chromanone oxime
7-bromo-4-chromanone oxime
8-bromo-7-chloro-4-chromanone oxime
7,8-dichloro-4-chromanone oxime
6,7-dichloro-4-chromanone oxime
7-chloro-6-fluoro-4-chromanone oxime
7-bromo-6-fluoro-4-chromanone oxime
7-chloro-8-fluoro-4-chromanone oxime
7-chloro-4-chromanone oxime methyl ether
7-bromo-4-chromanone oxime methyl ether
7-chloro-8-fluoro-4-chromanone oxime methyl ether
7,8-dichloro-4-chromanone oxime methyl ether
6,7-dichloro-4-chromanone oxime methyl ether
7-chloro-6-fluoro-4-chromanone oxime methyl ether
7-bromo-6-fluoro-4-chromanone oxime methyl ether
8-bromo-7-chloro-4-chromanone oxime methyl ether
6-bromo-7-chloro-4-chromanone oxime methyl ether Detailed working examples describing the preparation of many of the above compounds and other compounds useful for this invention are disclosed in my copending application, Ser. No. 786,443 filed Jan. 20, 1969, and now U.S. Pat. No. 3,510,497. This disclosure of application, Ser. No. 786,443 and all other disclosures of said copending application not expressly set forth herein is hereby incorporated by reference for a more complete understanding of the invention.

The compounds of this invention can be administered to mammals for diuretic and anti-hypertensive effect according to this invention by any suitable means. The preferred route of administration is by the oral route although in some instances, it may be more desirable to administer the active compound intramuscularly or rectally.

The dosage administered will be dependent upon age, health and weight of the recipient, the kind of concurrent treatment if any, frequency of treatment, and the nature of the effect desired. Generally, a daily dosage of active ingredient compound will be from about 0.1 to 60 mg. per kg. of body weight, although lower, such as 0.05 mg./kg. or higher amounts can be used. Ordinarily, from 1 to 40 mg./kg. and preferably 2 to 20 mg./kg. per day, in one or more applications per day, is effective to obtain the desired result.

The diuretic activity of the compounds of this invention is demonstrated in a test conducted as described below.

The subjects used for the test are male, Carworth Farms, CFE rats weighing between 80 and 130 grams (Mean ± 10 grams in any one test). The animals are not fasted prior to the experiment but they are deprived of food and water during the test.

The quantity of test compound required for administration is dissolved or suspended in PVA-acacia medium. The PVA-acacia medium contains 1 percent polyvinyl alcohol, 5 percent acacia, U.S.P., 0.1 percent methyl paraben and the balance water. The concentration of active compound in the PVA-acacia medium is adjusted so that the desired dose is present in a volume of 1 ml. of formulation per 100 grams of body weight.

The test compounds are administered by intubation to groups of six rats at each of three dose levels (3X increment). In addition 2 ml. of water per 100 grams of body weight is also administered to each test animal to produce uniform hydration of the test subject.

The animals are then placed in metabolism cages (three per cage) immediately after the test compound and water are administered. The cages are suspended over funnels fitted with feces separators and the total urine excreted by each group of six rats is collected over a period of four hours.

The urine volumes are recorded and the pH determined (Beckman Model G pH meter). The urine samples are stored in glass tubes at 5°C. until analyzed for sodium, potassium and chloride ion concentrations. Sodium and potassium are determined with a Baird-Atomic KY-1 flame photometer. Chloride is determined with an Aminco-Cotlove Chloride Titrator. The results are expressed as milliequivalents per sample.

The results of a number of 4-hour Urine and Electrolyte Excretion Tests run with PVA-acacia medium, chlorothiazide and acetazolamide are summarized in Table I.

The results of a 4-Hour Urine and Electrolyte Excretion Test run with the indicated compounds of this invention are reported in Table II. A comparison of the results reported in Table II with the results of known diuretic agents and with the vehicle used to administer the test compounds as reported in Table I demonstrates the diuretic activity of the compounds of this invention.

an amount of at least 0.02 percent by weight based on the total weight of the composition and not more than 99 percent by weight.

In view of the insoluble nature of the compounds of this invention, particularly those compounds of Formula (1) where R is $CH_3$ the particle size of the bulk drug must be examined prior to dosage form preparation. For example, it has been observed for some of these compounds that when the average particle diameter is reduced, the biological activity increases.

TABLE I

| Test compound | Oral dose, mg./kg. | 4-hour urine and electrolyte excretion* | | | | |
|---|---|---|---|---|---|---|
| | | Volume, ml. | pH | Na | K | Cl |
| | | | | Meq./group | | |
| Chlorothiazide | 10 | 9±5 | 6.3±0.2 | 0.6±0.3 | 1.1±0.6 | 1.1±0.6 |
| | 30 | 11±4 | 6.4±0.2 | 0.8±0.5 | 1.1±0.6 | 1.4±0.6 |
| | 100 | 16±4 | 6.4±0.3 | 1.6±0.5 | 1.9±0.9 | 2.5±0.7 |
| Acetazolamide | 1 | 10±5 | 7.7±0.3 | 0.9±0.6 | 1.3±0.3 | 0.8±0.2 |
| | 3 | 11±3 | 8.0±0.2 | 1.1±0.4 | 1.2±0.4 | 0.7±0.2 |
| | 10 | 15±6 | 8.0±0.3 | 1.7±0.6 | 1.6±0.5 | 0.9±0.2 |
| PVA-acacia medium | | 5±3 | 6.2±0.2 | 0.2±0.1 | 0.7±0.4 | 0.5±0.2 |

*Control data includes mean ± standard deviation.

TABLE II

| Test compound | Oral dose, mg./kg. | 4-hour urine and electrolyte excretion | | | | |
|---|---|---|---|---|---|---|
| | | Volume, ml. | pH | Na | K | Cl |
| | | | | Meq./group | | |
| 7-chloro-4-chromanone oxime | 30 | 21 | 6.0 | 2.1 | 1.4 | 4.7 |
| | 100 | 37 | 6.2 | 3.7 | 1.7 | 5.5 |
| | 300 | 46 | 6.3 | 5.2 | 1.9 | 6.7 |
| 7,8-dichloro-4-chromanone oxime | 30 | 24 | 6.1 | 2.4 | 2.0 | 4.0 |
| | 100 | 47 | 6.3 | 6.0 | 2.6 | 7.4 |
| | 300 | 49 | 6.4 | 5.4 | 2.7 | 7.8 |
| 7-chloro-6-fluoro-4-chromanone oxime | 1 | 4 | 6.5 | 0.3 | 0.7 | 0.5 |
| | 3 | 6 | 6.1 | 0.3 | 1.7 | 0.9 |
| | 10 | 21 | 5.8 | 1.4 | 1.5 | 2.6 |
| 7-chloro-6-fluoro-4-chromanone oxime methyl ether | 1 | 3 | 6.7 | 0.3 | 0.6 | 0.4 |
| | 3 | 7 | 6.7 | 0.5 | 0.9 | 0.6 |
| | 10 | 5 | 6.6 | 0.4 | 0.9 | 0.7 |
| Do | 30 | 25 | 6.4 | 2.7 | 2.1 | 3.4 |
| | 100 | 40 | 6.3 | 4.5 | 2.4 | 5.2 |
| | 300 | 47 | 6.5 | 5.3 | 2.7 | 6.0 |
| 6,7-dichloro-4-chromanone oxime methyl ether | 1 | 1 | 6.6 | 0.1 | 0.3 | 0.1 |
| | 3 | 3 | 7.0 | 0.0 | 0.0 | 0.0 |
| | 10 | 5 | 6.6 | 0.1 | 0.2 | 0.2 |
| Do | 10 | 5 | 6.7 | 0.3 | 0.8 | 0.6 |
| | 30 | 10 | 6.6 | 0.9 | 1.2 | 1.4 |
| | 100 | 27 | 6.3 | 2.8 | 1.5 | 3.5 |
| 7-chloro-4-chromanone oxime methyl ether | 30 | 10 | 6.2 | 1.0 | 1.4 | 1.7 |
| | 100 | 19 | 6.2 | 2.2 | 1.7 | 3.1 |
| | 300 | 33 | 6.7 | 3.8 | 2.1 | 4.4 |
| 7,8-dichloro-4-chromanone oxime methyl ether | 1 | 2 | 6.5 | 0.1 | 0.7 | 0.3 |
| | 3 | 2 | 6.6 | 0.2 | 0.5 | 0.3 |
| | 10 | 4 | 6.5 | 0.4 | 1.0 | 0.8 |
| Do | 30 | 15 | 6.3 | 1.9 | 1.9 | 2.5 |
| | 100 | 33 | 6.3 | 4.0 | 2.4 | 4.8 |
| | 300 | 45 | 6.3 | 5.0 | 2.5 | 5.9 |
| 7-bromo-4-chromanone oxime | 30 | 23 | 6.1 | 1.8 | 1.6 | 2.8 |
| | 100 | 41 | 6.4 | 3.8 | 2.0 | 5.1 |
| | 300 | 60 | 6.4 | 6.4 | 2.5 | 7.9 |
| 7-bromo-4-chromanone oxime methyl ether | 30 | 8 | 6.5 | 0.8 | 1.3 | 1.4 |
| | 100 | 23 | 6.6 | 2.5 | 2.6 | 3.5 |
| | 300 | 40 | 6.6 | 4.7 | 3.0 | 5.9 |
| 7-bromo-6-fluoro-4-chromanone oxime | 10 | 23 | 6.1 | 1.7 | 2.3 | 2.9 |
| | 30 | 42 | 6.2 | 3.9 | 2.4 | 5.6 |
| | 100 | 60 | 6.6 | 5.9 | 2.8 | 7.7 |
| | 300 | 64 | 6.6 | 6.5 | 2.7 | 8.4 |
| 7-bromo-6-fluoro-4-chromanone oxime methyl ether | 10 | 22 | 6.5 | 1.6 | 2.6 | 2.9 |
| | 30 | 35 | 6.3 | 2.7 | 2.0 | 4.3 |
| | 100 | 47 | 6.1 | 4.5 | 2.3 | 6.2 |
| | 300 | 58 | 6.6 | 6.0 | 3.3 | 7.9 |

The active ingredient of this invention can be employed in useful compositions according to the present invention in such dosage forms as tablets, capsules, powder packets, or liquid solutions, suspensions or elixirs, for oral administration or liquid solutions for parenteral use, and in certain cases, suspensions for parenteral use (except intravenous). In such compositions the active ingredient will ordinarily be present in The use of surfactants to aid in the wetting of the particle helps to maintain the particle size-activity relationship. In general, for the water-insoluble compounds of this invention, the average particle diameter should be reduced to 5 microns or less.

Besides the active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50 percent by weight of a compound of Formula (1) and 99–50 percent of an excipient such as starch, lactose, mannitol, calcium sulfate, microcrystalline cellulose, talc, magnesium stearate and finely divided silicon dioxide. In another embodiment the active ingredient is tableted. In yet another embodiment, the active ingredient is put into powder packets and employed. These capsules, tablets and powders will generally constitute from about 1 percent to about 95 percent and preferably from 1 percent to 50 percent by weight of active ingredient. These dosage forms preferably contain from about 5 to about 1,000 mg. of active ingredient, with from about 10 to about 250 most preferred.

In still another embodiment, the active ingredient may be formulated into suppositories for rectal use. Such suppositories will generally constitute from about 1 percent to 50 percent and preferably from 1 percent to 25 percent, by weight, of the active ingredient, admixed with a suitable base. Suitable bases are theobroma oil, mixtures of polyethylene glycols, wax-oil mixtures (for use in preparing gelatin rectal capsules), and mixtures of triglycerides of saturated vegetable fatty acids with varying proportions of partial glycerides.

The pharmaceutical carrier can, as previously indicated, be a liquid such as water and oils, including those of petroleum, animal, vegetable or synthetic origin, for example, peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable preparations.

As mentioned above, oral administration can be in a suitable suspension or syrup, in which the active ingredient ordinarily will constitute from about 0.02 to 10 percent, and preferably about 0.1 to 1 percent by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention.

EXAMPLE 1

A large number of unit capsules are prepared for oral administration by filling standard two-piece hard gelatin capsules weighing about 80 mg. each with 50 mg. of powdered 6,7-dichloro-4-chromanone oxime methyl ether and 400 mg. of a mixture consisting of 89 parts anhydrous lactose, 8 parts talc, 2 parts magnesium stearate and 1 part polyoxyl 40 stearate.

EXAMPLE 2

A large number of unit capsules are prepared for oral administration by filling soft gelatin capsules with a suspension of 6,7-dichloro-4-chromanone oxime in a mixture of soybean oil and polysorbate 80 (95:5).

EXAMPLE 3

Another dosage unit contains 50 mg. of active ingredient, 8 mg. of gelatin, 6 mg. of magnesium stearate, 150 mg. of mannitol, 12 mg. of surfactant and 20 mg. of corn starch, mixed and formed into a tablet by conventional tableting procedures. Slow release tablets can also be used, by applying appropriate coatings.

EXAMPLE 4

A flavored syrup containing 1 mg. of 6,7-dichloro-4-chromanone oxime in 5 ml. can be prepared by dissolving the compound in a flavored solution of sorbitol containing up to 50 percent of ethyl alcohol USP so that the final concentration is 0.02 percent weight/volume.

EXAMPLE 5

Suppositories are prepared by dispersing 50 mg. of powdered 6-fluoro-7-chloro-4-chromanone oxime methyl ether in a mixture of 2.25 Gm. of polyethylene glycol 1,000 and 0.75 Gm. of polyethylene glycol 4,000, pouring into an appropriate mold and cooling to form the suppository.

EXAMPLE 6

6,7-Dichloro-4-chromanone oxime is formulated conveniently in ethyl alcohol USP-water in 0.1 percent by weight concentration for oral administration, with and without a flavoring agent, and a coloring agent, etc.; and in 100 milligram amounts in standard two-piece hard gelatin capsules with a diluent such as starch, mannitol or lactose, for oral administration. In pharmacologic applications it is administered in these dosage forms at dosage levels in the range of 10 to 250 milligrams for treatment of physiologic conditions as described above.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

The disclosure herein should not be taken as a recommendation to use the disclosed invention in any way without full compliance with Food and Drug Laws and other laws and governmental regulations which may be applicable.

Since obviously many variations of the invention can be made without departing from the spirit and scope thereof, it is to be understood that the foregoing detailed description has been given for clearness of understanding only, and no unnecessary limitations are to be interpreted therefrom.

I claim:

1. A method of producing a diuretic effect in mammals comprising administering to said mammal a diuretically effective amount of a compound of the formula

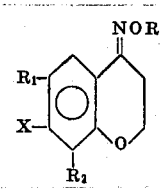

where
R is hydrogen or methyl;
$R_1$ and $R_2$ can be the same or different and are each selected from the group consisting of hydrogen, bromine, fluorine and chlorine, with the limitation that at least one of $R_1$ and $R_2$ must be hydrogen; and
X is bromine or chlorine.

2. A method of producing a diuretic effect in mammals comprising administering to said mammal a diuretically effective amount of a compound of the formula

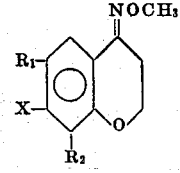

where $R_1$ and $R_2$ can be the same or different and are each selected from the group consisting of hydrogen, bromine, fluorine and chlorine, with the limitation that at least one of $R_1$ and $R_2$ must be hydrogen; and X is bromine or chlorine.

3. A method of producing a diuretic effect in mammals comprising administering to said mammal a diuretically effective amount of a compound of the formula

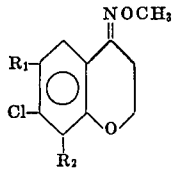

where $R_1$ and $R_2$ can be the same or different and are each selected from the group consisting of hydrogen, bromine, fluorine and chlorine, with the limitation that at last one of $R_1$ and $R_2$ must be hydrogen.

4. A method of producing a diuretic effect in mammals comprising administering to said mammal a diuretically effective amount of a compound of the formula

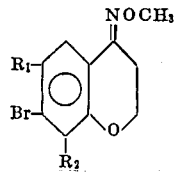

where $R_1$ and $R_2$ can be the same or different and are each selected from the group consisting of hydrogen, bromine, fluorine, and chlorine, with the limitation that at least one of $R_1$ and $R_2$ must be hydrogen.

5. A method of producing a diuretic effect in mammals comprising administering to said mammal a diuretically effective amount of 7-chloro-6-fluoro-4-chromanone oxime.

6. A method of producing a diuretic effect in mammals comprising administering to said mammal a diuretically effective amount of 7-chloro-6-fluoro-4-chromanone oxime methyl ether.

7. A method of producing a diuretic effect in mammals comprising administering to said mammal a diuretically effective amount of 7-chloro-8-fluoro-4-chromanone oxime.

8. A method of producing a diuretic effect in mammals comprising administering to said mammal a diuretically effective amount of 7-chloro-8-fluoro-4-chromanone oxime methyl ether.

9. A pharmaceutical composition containing from 1 percent to 99.98 percent by weight of a pharmaceutical carrier in combination with from 0.02 percent to 99 percent by weight of a diuretic compound of the formula

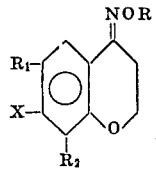

where

R is hydrogen or methyl;

$R_1$ and $R_2$ can be the same or different and are each selected from the group consisting of hydrogen, bromine, fluorine and chlorine, with the limitation that at least one of $R_1$ and $R_2$ must be hydrogen; and X is bromine or chlorine.

10. The pharmaceutical composition of claim 9 in which the active ingredient is a compound of the formula:

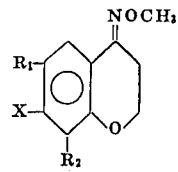

where $R_1$ and $R_2$ can be the same or different and are each selected from the group consisting of hydrogen, bromine, fluorine and chlorine, with the limitation that at least one of $R_1$ and $R_2$ must be hydrogen; and X is bromine or chlorine.

11. The pharmaceutical composition of claim 9 in which the active ingredient is a compound of the formula:

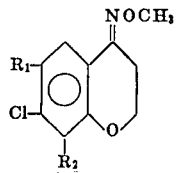

where $R_1$ and $R_2$ can be the same or different and are each selected from the group consisting of hydrogen, bromine, fluorine and chlorine, with the limitation that at least one of $R_1$ and $R_2$ must be hydrogen.

12. The pharmaceutical composition of claim 9 in which the active ingredient is a compound of the formula:

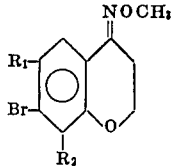

where $R_1$ and $R_2$ can be the same or different and are each selected from the group consisting of hydrogen, bromine, fluorine, and chlorine, with the limitation that at least one of $R_1$ and $R_2$ must be hydrogen.

13. The pharmaceutical composition of claim 9 in which the active ingredient is 7-chloro-6-fluoro-4-chromanone oxime.

14. The pharmaceutical composition of claim 9 in which the active ingredient is 7-chloro-6-fluoro-4-chromanone oxime methyl ether.

15. The pharmaceutical composition of claim 9 in which the active ingredient is 7-chloro-8-fluoro-4-chromanone oxime.

16. The pharmaceutical composition of claim 9 in which the active ingredient is 7-chloro-8-fluoro-4-chromanone oxime methyl ether.

17. The unit pharmaceutical dosage form of the composition of claim q selected from the group consisting of a capsule and a tablet.

18. The unit pharmaceutical dosage form of the composition of claim 9 selected from the group consisting of a syrup and a suspension.

* * * * *